(12) United States Patent
Yamaguchi et al.

(10) Patent No.: US 7,558,460 B2
(45) Date of Patent: Jul. 7, 2009

(54) OPTICAL DVI CABLE SYSTEM AND METHOD OF LAYING CABLE

(75) Inventors: Hideki Yamaguchi, Kanagawa (JP); Hideya Konda, Kanagawa (JP); Toshio Morita, Tokyo (JP); Satoshi Koide, Tokyo (JP); Nobuhiko Utagawa, Saitama (JP)

(73) Assignees: Sumitomo Electric Industries, Ltd., Osaka (JP); Stack Electronics Co., Ltd., Tokyo (JP)

( * ) Notice: Subject to any disclaimer, the term of this patent is extended or adjusted under 35 U.S.C. 154(b) by 570 days.

(21) Appl. No.: 11/486,393

(22) Filed: Jul. 14, 2006

(65) Prior Publication Data

US 2007/0014522 A1    Jan. 18, 2007

(30) Foreign Application Priority Data

Jul. 15, 2005    (JP)    ............................ P.2005-207367

(51) Int. Cl.
*G02B 6/00* (2006.01)
*G02B 6/44* (2006.01)
(52) U.S. Cl. ........................ 385/139; 385/101; 385/102; 385/113
(58) Field of Classification Search ......... 385/100–114, 385/139
See application file for complete search history.

(56) References Cited

U.S. PATENT DOCUMENTS

| 7,065,604 | B2 * | 6/2006 | Konda et al. ................. 710/315 |
| 7,444,446 | B2 * | 10/2008 | Yamaguchi et al. ......... 710/106 |
| 2006/0031611 | A1 * | 2/2006 | Konda ......................... 710/72 |

FOREIGN PATENT DOCUMENTS

| JP | 2002-366340 | 12/2002 |
| JP | 2004-241361 | 8/2004 |
| JP | 2006-050292 | 2/2006 |
| JP | 2006-310197 | 11/2006 |

OTHER PUBLICATIONS

Japanese Office Action issued in Japanese Patent Application No. JP 2005-207367 dated on Dec. 16, 2008.
Nihon Koukuu Denshi Kougyou Kabushiki Kaisha Catalog 2003.7 MB-11030-1, Hikari DVI Module, FOJL-DV2S31.

* cited by examiner

*Primary Examiner*—Kevin S Wood
(74) *Attorney, Agent, or Firm*—McDermott Will & Emery LLP (57) ABSTRACT

A composite cable 21 with a plug 22 attached thereto includes optical fibers, metal wires, a tensile strength fiber 21a, and an envelope 21b for enveloping them and the plug 22 includes a ferrule 210 of the plug for connecting the optical fiber, a cable clamp 221 and a Kevler holder 222 (first fixing mechanism) for fixing the tensile strength fiber 21a, and a gasket 223 (second fixing mechanism) for blocking a twist of the envelope 21b and further includes a joint mechanism (227) of a detachable traction cap for pulling the composite cable 21 and inserting the composite cable 21 into piping.

7 Claims, 7 Drawing Sheets

SIDE WHERE CABLE IS LAID IN PIPING

SIDE WHERE LAYING IN PIPING IS NOT REQUIRED

STEEP BENDING OCCURS IN FIBER IN CONNECTOR

FIG. 5B

FIBER LENGTH EXTENSION → UPSIZING → POOR PIPE LAYING ADAPTABILITY

FIG. 5C

NO BENDING

SPRING BACK AND BENDING

SIDE WHERE CABLE IS LAID IN PIPING (SMALL SIZE)

SIDE WHERE LAYING IN PIPING IS NOT REQUIRED (LARGE SIZE)

OPTICAL DVI CABLE SYSTEM AND METHOD OF LAYING CABLE

This application is based on Japanese Patent Application (No. 2005-207367) filed on Jul. 15, 2005, which is incorporated herein by reference.

FIELD OF THE INVENTION

This invention relates to an optical DVI cable system for transmitting a digital signal and a cable laying method of applying the optical DVI cable system to previously laid piping.

DESCRIPTION OF RELATED ARTS

Hitherto, an optical DVI cable conforming to DVI (Digital Visual Interface) transmission interface standard has been commercially available. (For example, refer to non-patent document 1 (Nihon koukuu denshi kyougyou kabushiki kaisha Catalog 2003.7 MB-11030-1DVI. pdf).)

The optical DVI cable is made up of a transmission module, a reception module, and a photoelectric composite cable; the transmission module incorporates electric-optic conversion means for converting a digital video signal input from a host into an optical signal and the reception module incorporates photoelectric conversion means for converting an optical signal transmitted from the transmission module into an electric signal.

The photoelectric composite cable contains a plurality of optical fibers and a plurality of metal wires (mainly, copper wires) and each optical fiber transmits an optical signal from the transmission module to the reception module. The metal wires include a power supply wire, a ground wire, a DDC (Data Display Channel) signal wire, etc.

By the way, in the optical DVI cable in the related art, the transmission module and the reception module are standardized and are each of a large size and thus it is difficult to insert the cable into usual piping at the cable laying time; this is a problem. In this connection, each of the transmission module and the reception module used with the optical DVI cable is 39 mm wide, 15.4 mm thick, and 53 mm deep (main body portion).

SUMMARY OF THE INVENTION

It is an object of the invention to provide an optical DVI cable system and a cable laying method for enabling cable laying to be facilitated.

Embodiments of the invention are as follows:
(1) An optical DVI cable system provided with connection points where a plug and an adapter are connected on a line equipped with optical DVI connectors at both ends, wherein a first cable connected between the optical DVI connector and the plug includes an optical fiber, a metal wire, a tensile strength fiber, and an envelope for enveloping them and is laid as the plug is passed through piping, and wherein the plug includes a first ferrule for connecting the optical fiber, a first fixing mechanism for fixing the tensile strength fiber, a second fixing mechanism for blocking a twist of the envelope, and a joint mechanism of a detachable traction cap for pulling the cable and allowing the cable to pass through the piping.
(2) In the optical DVI cable system as described above in (1), the joint mechanism of the traction cap is joint means formed for allowing either the cap or the plug to rotate relative to the other.
(3) In the optical DVI cable system as described above in (1) or (2), a rear end face of the plug is formed as a slope inclined toward the axial center from the outer face.
(4) In the optical DVI cable system as described above in (1), the adapter includes a second ferrule for connecting the optical fiber and an elastic mechanism for pressing the second ferrule against the first ferrule and the second ferrule abuts the first ferrule at the connection point and retreats into the adapter.
(5) A cable laying method of applying the optical DVI cable system as described above in any of (1) to (4) to previously laid piping, the cable laying method having the steps of joining the traction cap to the tip of the plug detached at the connection point; pulling the traction cap and allowing the first cable connected to the plug to pass through the piping; removing the traction cap from the plug passed through the piping; and joining the plug from which the traction cap is removed to the adapter.
(6) In the cable laying method as described above in (1), the plug has an outer diameter of 19 mm or less and is passed through the piping.

In the optical DVI cable system as described above in (1), a connection point is provided at an intermediate point of the line and the plug provided at the cable end of the cable inserted into piping is of small size appropriate for laying the cable in piping, whereby laying the cable in piping is made possible. The used cable is a photoelectric composite cable of optical fibers and metal wires that can use general optical DVI members as both end connectors and particularly the cable containing the plug laid in piping is provided with a tensile strength fiber for sharing the tension at the time of laying the cable in piping. The plug is provided with the first fixing mechanism for fixing the tensile strength fiber and the tensile strength fiber is fixed by the first fixing mechanism, whereby the tension at the time of laying the cable in piping can be shared and the optical fibers and the metal wires in the optical fiber are not broken. The plug is also provided with the second fixing mechanism for blocking a twist of the envelope of the cable and the envelope of the cable is fixed by the second fixing mechanism, whereby a break in the optical fiber caused by twisting the envelope of the cable at the time of laying the cable in piping can be prevented. Therefore, cable laying can be easily conducted without breaking the optical fiber or the metal wire in the cable 21.

In the optical DVI cable system as described above in (2), the joint mechanism for joining the traction cap to the plug is included. Thus, when the optical DVI cable to which the plug is connected is inserted into piping, the traction cap is joined to the plug, whereby the optical DVI cable can be extremely easily inserted into piping. Moreover, since either the traction cap or the plug is allowed to rotate relative to the other, if a twist occurs while the optical DVI cable is inserted into piping, the twist is absorbed, so that a break does not occur in wiring between the optical DVI cable and the plug (optical fiber, metal wire).

In the optical DVI cable system as described above in (3), the rear end face of the plug is formed as a slope inclined toward the axial center from the outer face. Thus, when the optical DVI cable inserted into piping is drawn out from the piping for the purpose of maintenance, etc., if there is any other wire inserted into the piping, the optical DVI cable can be easily drawn out without being caught in the wire.

In the optical DVI cable system as described above in (4), the adapter includes the elastic mechanism for pressing the ferrule of the adapter for connecting the optical fiber against the ferrule of the plug, so that the tips of the optical fiber and the metal wires of the ferrule of the adapter and those of the ferrule of the plug can be brought into elastic contact with each other for reliable connection of the optical fibers and the metal wires. Moreover, since the elastic mechanism is not provided for the plug, bending of the optical fiber in the plug caused by pressing the ferrule of the adapter does not occur. That is, the plug absorbs bending of the optical fiber and thus the shape of the plug need not be made long for installing the elastic mechanism and the plug can be miniaturized. Since the plug can be miniaturized, inserting the optical DVI cable into piping is still more facilitated.

In the cable laying method as described above in (5), inserting the optical DVI cable into piping can be extremely easily conducted.

In the cable laying method as described above in (6), the outer diameter of the plug is suppressed to 19 mm or less, so that the plug can also be passed through standard diameter piping in foreign specifications, for example, standard 19-mm diameter piping in USA specifications.

DETAILED DESCRIPTION OF THE PREFERRED EMBODIMENT

Referring now to the accompanying drawings, there is shown a preferred embodiment of the invention.

Figure 1:
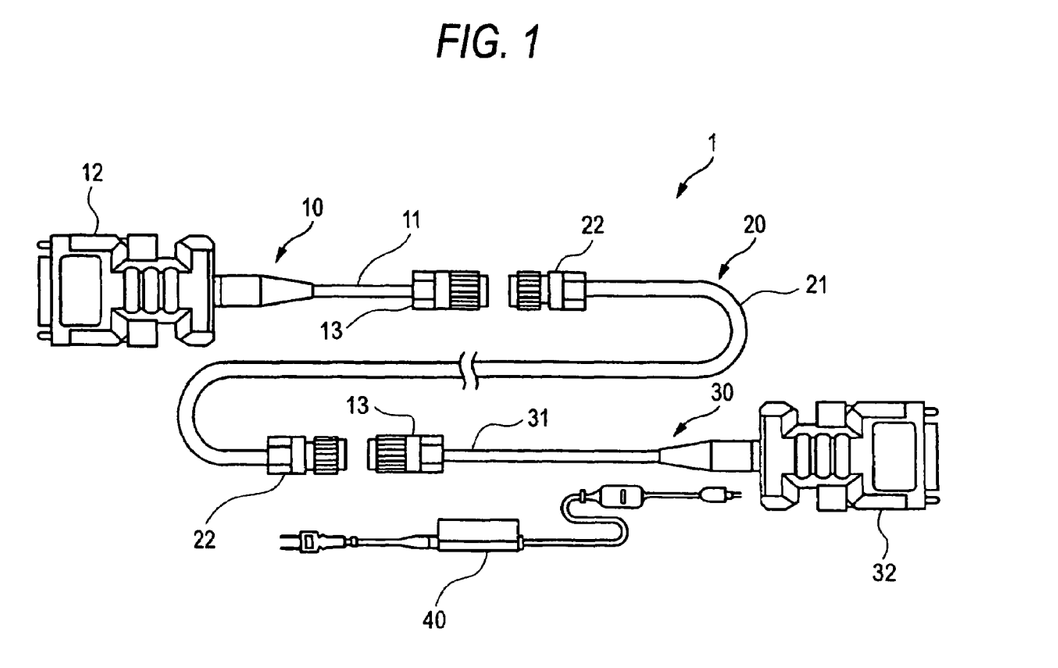
FIG. 1 is a plan view to show the appearance of an optical DVI cable system according to one embodiment of the invention.

FIG. 1 is a plan view to show the appearance of an optical DVI cable system 1 according to one embodiment of the invention.

In the figure, the optical DVI cable system 1 of the embodiment includes a transmission cable 10, an intermediate cable 20, a reception cable 30, and an AC/DC power supply converter (so-called AC adapter) 40.

The transmission cable 10 is made up of an insulation-coated optical fiber/metal wire composite cable (mixed cable of optical fiber and metal wire (mainly, copper wire), hereinafter referred to as composite cable) 11, a male DVI connector 12 connected to one end of the cable, and a female photoelectric composite relay connector (hereinafter referred to as adapter) 13 connected to an opposite end of the cable.

The intermediate cable 20 is made up of an insulation-coated optical fiber/metal wire composite cable (mixed cable of optical fiber and metal wire (mainly, copper wire), hereinafter referred to as composite cable) 21 and male photoelectric composite relay connectors (hereinafter referred to as plugs) 22 connected to both ends of the cable.

Each plug 22 of the intermediate cable 20 has an outer diameter of 17.5 mm and can be allowed to easily pass through a small-diameter pipe conduit, for example, standard 19-mm diameter piping in USA specifications and a narrow space at the cable laying time.

The reception cable 30 is made up of an insulation-coated optical fiber/metal wire composite cable (mixed cable of optical fiber and metal wire (mainly, copper wire), hereinafter referred to as composite cable) 31, a male DVI connector 32 connected to one end of the cable, and a female photoelectric composite relay connector (hereinafter referred to as adapter) 13 connected to an opposite end of the cable.

The male DVI connector 32 of the reception cable 30 contains a compensation circuit 50 (see FIG. 2) for compensating distortion and attenuation produced by passing a digital signal through the metal wire.

Figure 2:
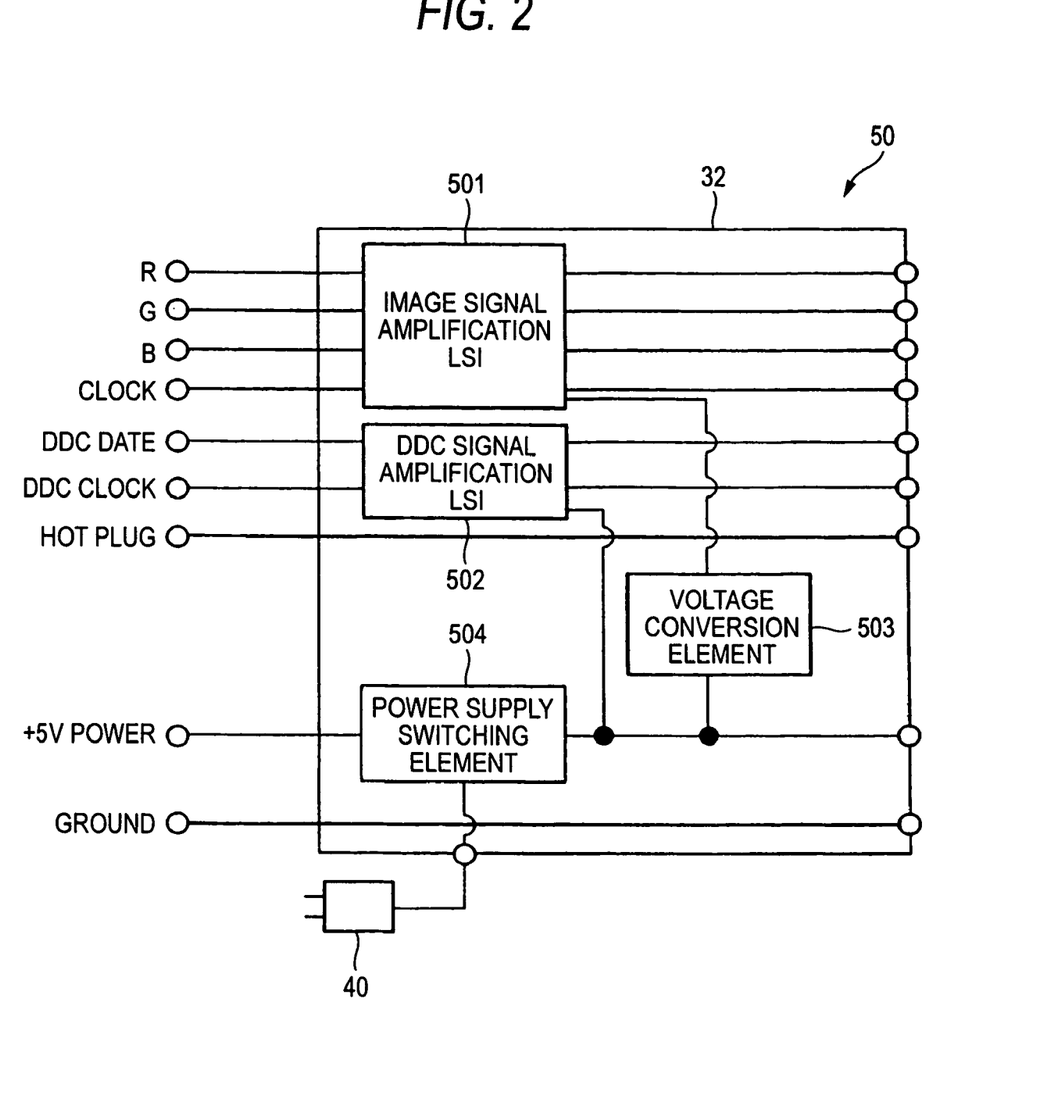
FIG. 2 is a block diagram to show the configuration of a compensation circuit contained in a male DVI connector of a reception cable in FIG. 1.

The compensation circuit 50 includes an image signal amplification LSI 501, a DDC (Display Data Channel) signal amplification LSI 502, a voltage conversion element 503, and a power supply switching element 504, as shown in FIG. 2.

The image signal amplification LSI 501 has a function of improving distortion of a digital signal and amplifying the digital signal to a predetermined level. As the image signal amplification LSI 501, a part compliant with an existing standard (for example, MAX3815 manufactured by USA MAXIM) can be used; it is easily acquired and is inexpensive. Accordingly, a rise in the manufacturing cost can be minimized.

The DDC signal amplification LSI 502 has a function of conducting communications based on the DVI standard between a video output machine of a personal computer, a DVD playback apparatus, etc., (not shown) and a video input machine of a projector, a liquid crystal display, etc., (not shown). That is, the DDC signal amplification LSI 502 transmits and receives digital data called a DDC signal for transmitting the display capability of the video output machine (namely, resolution) to the video input machine and transmitting a mutual authentication signal between the video output machine and the video input machine to protect the copyright of an image source.

Since the transmission speed of the DDC signal is low (about one in several thousands) as compared with that of an image signal, usually shaping and amplification are not required, but an LSI for shaping and amplifying the DDC signal may be contained as required.

As the power supply required for operating the image signal amplification LSI 501 and the DDC signal amplification LSI 502, a power line is made to branch for supplying power to both the LSIs 501 and 502 so that +5V surplus power provided following the DVI standard can be used. Particularly, since the drive voltage of the image signal amplification LSI 501 often is +3.3 V, the voltage conversion element 503 is provided at an intermediate point of the branch power line for converting +5 V into +3.3 V. Since the +5-V surplus power may be insufficient depending on the specifications of the video output machine of a personal computer, a DVD playback apparatus, etc., the AC/DC power supply converter 40 for converting AC power of 100 V to 240 V into DC power of +5 V can be connected to the male DVI connector 32.

It is difficult to control the power supply so that the essentially provided +5-V power supply and +5 V provided by the AC/DC power supply converter 40 become strictly the same voltage, and occurrence of a minute voltage difference cannot be avoided. In this case, it is predicted that an unexpected current will occur and will flow through the circuitry, resulting in occurrence of a fault in a video input machine of a projector, a liquid crystal display, etc., (not shown) or a video output machine of a personal computer, a DVD playback apparatus, etc., (not shown). To circumvent the accident, the power supply switching element 504 is provided for shutting out connection to the essentially provided +5V power supply by detecting the voltage of the AC/DC power supply converter 40 if the AC/DC power supply converter 40 is connected.

Figure 3:
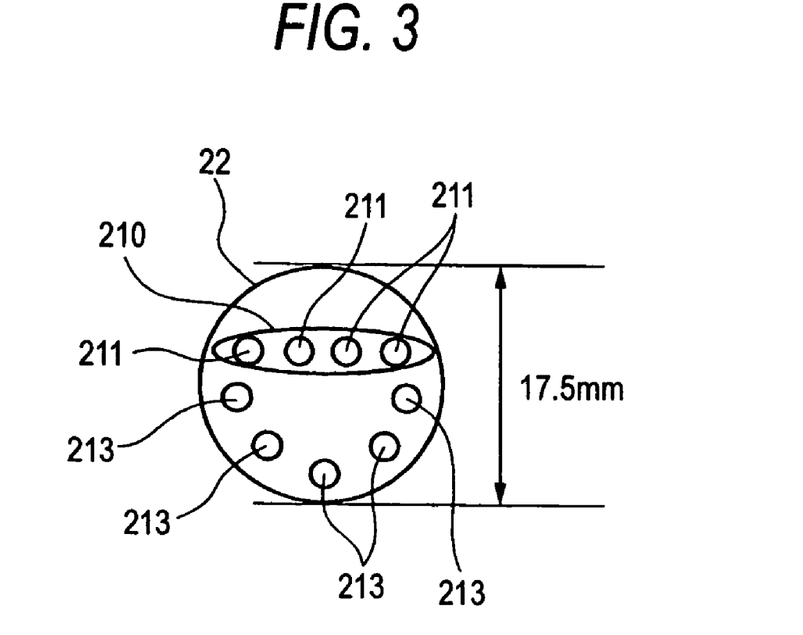
FIG. 3 is a drawing to show an end face of a plug connected to an intermediate cable in FIG. 1.

Referring again to FIG. 1, each plug 22 of the intermediate cable 20 is provided with a ferrule 210 for collectively retaining four-core optical fiber 211 as shown in FIG. 3.

The adapter 13 of the transmission cable 10 and the adapter 13 of the reception cable 30 are provided each with a ferrule 132 optically coupled with the ferrule 210 of the plug 22 of the intermediate cable 20 (see FIG. 8), and the ferrules butt against each another, making it possible to transmit an optical signal (for example, a DVI image signal (TMDS)). Particularly, the ferrule 210 of each of the plugs 22 provided at both ends of the intermediate cable 20 retains the four-core optical fiber 211 in a fixed state; the ferrule 132 of each of the adapters 13 of the transmission cable 10 and the reception cable 30 (see FIG. 8) urges the four-core optical fiber 211 forward, namely, to the plug 22 side of the intermediate cable 20. That is, it has an elastic mechanism using a spring 133 (see FIG. 8).

Figure 4:
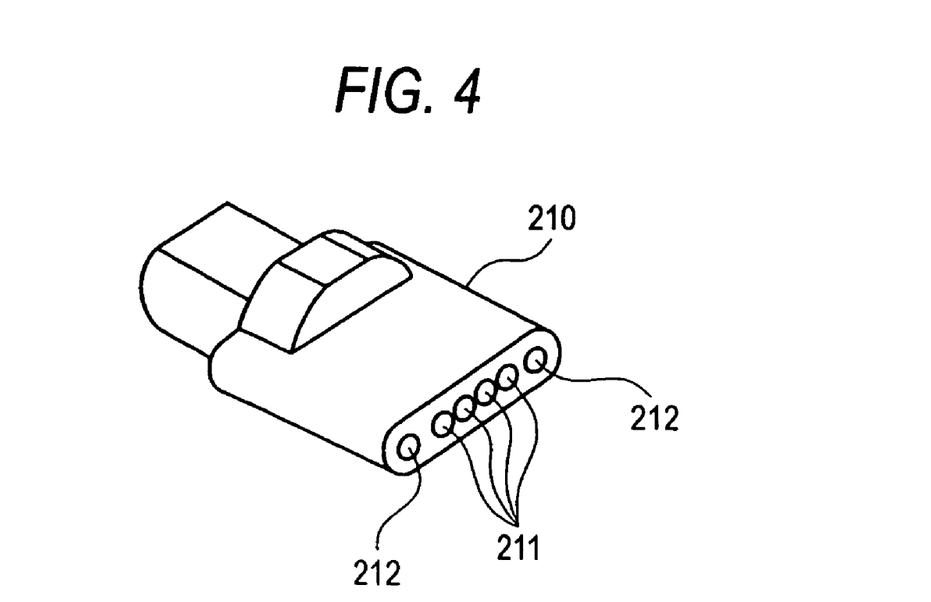
FIG. 4 is a perspective view to show the appearance of a ferrule contained in the plug connected to the intermediate cable in FIG.

The ferrule 210 of each of the plugs 22 of the intermediate cable 20 is formed with two guide holes 212 into which guide pins are to be inserted, on both sides sandwiching the four-core optical fiber 211 as shown in FIG. 4. The optical fibers are aligned by inserting guide pins 134 (see FIG. 8) into the two guide holes 212.

The reason why the ferrule of each plug 22 of the intermediate cable 20 is not provided with an elastic mechanism for urging the optical fiber 211 forward is as follows: As an elastic mechanism is added, if the ferrules in the plug 22 and the adapter 13 abut each other and spring back occurs, it is feared that the optical fiber 211 may bend so as to largely swell and may be broken. Then, if the plug 22 is extended to a long size in the length direction for the purpose of absorbing the swelling, the laying adaptability of the plug 22 for laying the intermediate cable 20 in piping is impaired.

Figure 5A:
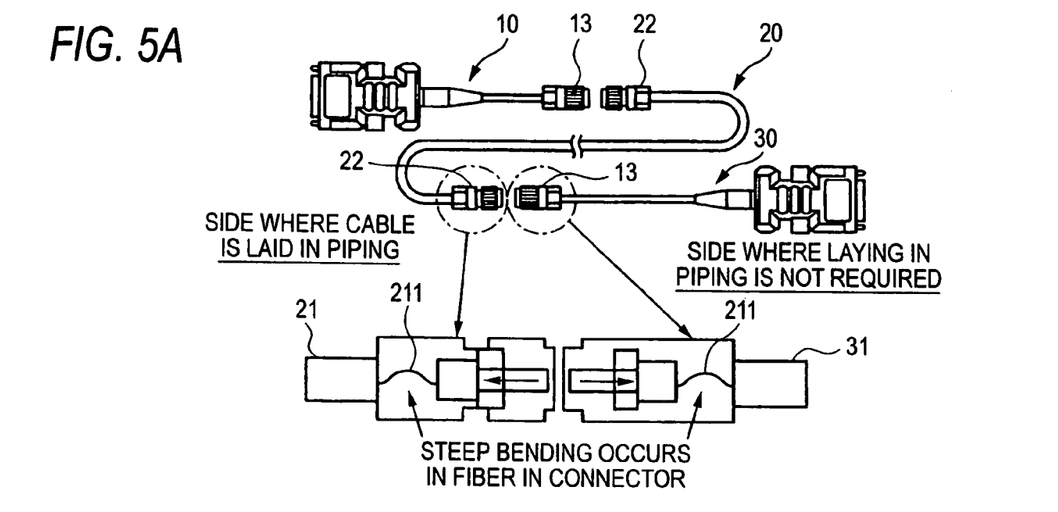
FIGS. 5A to 5C are schematic drawings to describe the effects at the connection time of a plug inserted into piping for cable laying and an adapter not inserted.
Figure 5B:
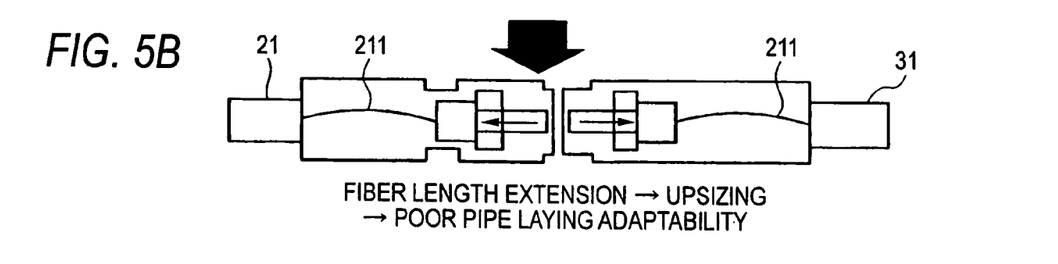
Figure 5C:
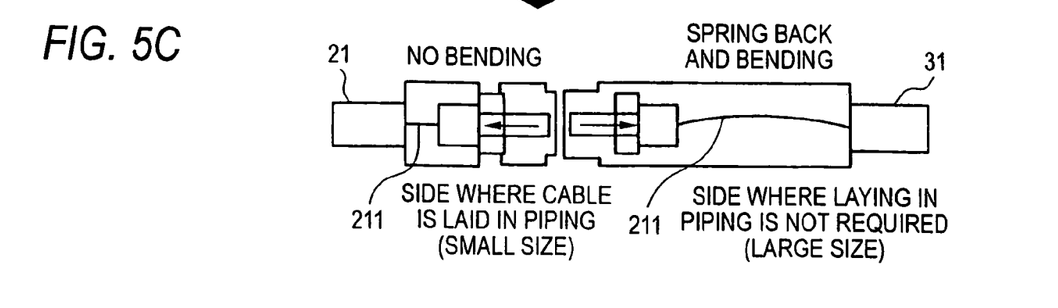

A description is given using schematic drawings of FIGS. 5A to 5C. FIG. 5A shows the case where the plug 22 and the adapter 13 are formed as small size and have each an elastic mechanism; each optical fiber 211 is largely bent because of spring back of the elastic mechanism. In this case, it is feared that the optical fiber 211 may be broken in both of the plug 22 and the adapter 13. FIG. 5B shows the case where the plug 22 and the adapter 13 are formed as large size (long dimension) and have each an elastic mechanism; if spring back occurs, the optical fiber 211 of each of the plug 22 and the adapter 13 bends small. In this case, particularly the plug 22 is of large size and thus the laying adaptability in piping are degraded. FIG. 5C shows the case where the plug 22 is of small size and does not have an elastic mechanism and the adapter 13 is of large size and has an elastic mechanism; since spring back of an elastic mechanism does not occur in the plug 22, the optical fiber does not bend. On the other hand, since the adapter 13 is of large size, if spring back of the elastic mechanism occurs, the optical fiber bends small.

As described above, as seen in FIGS. 5A to 5C, in the plug 22 involved in laying the cable in piping, no elastic mechanism is provided for downsizing and in the adapter 13 not involved in laying the cable in piping, the elastic mechanism is used for ensuring connection with the plug 22.

In the plug 22, to transmit an image signal over the four-core optical fiber 211 and transmit other signals (DDC, HPD, +5 V, etc.,) over metal wire as shown in FIG. 2, the connector size can be lessened to an outer diameter of about 17.5 mm and a length of 40 mm also considering easy assembling, securing the tension, and product reliability of the connector. Accordingly, it is made possible to lay the plug (connector) in a pipe having an inner diameter of 19 mm and the optical fiber 211 scarcely bends and thus the probability of a break becomes very small. On the other hand, in the adapter 13, although the optical fiber 211 bends because the elastic mechanism is included, if spring back occurs, there is no effect produced by bending of the optical fiber 211 because the size of the adapter in the length direction is large.

In FIG. 3, the plug 22 of the intermediate cable 20 is provided with five metal contacts (female pins) 213 for transmitting DDC Data, DDC Clock, HDP, +5 V power, and Ground in addition to the ferrule 210.

Figure 8:
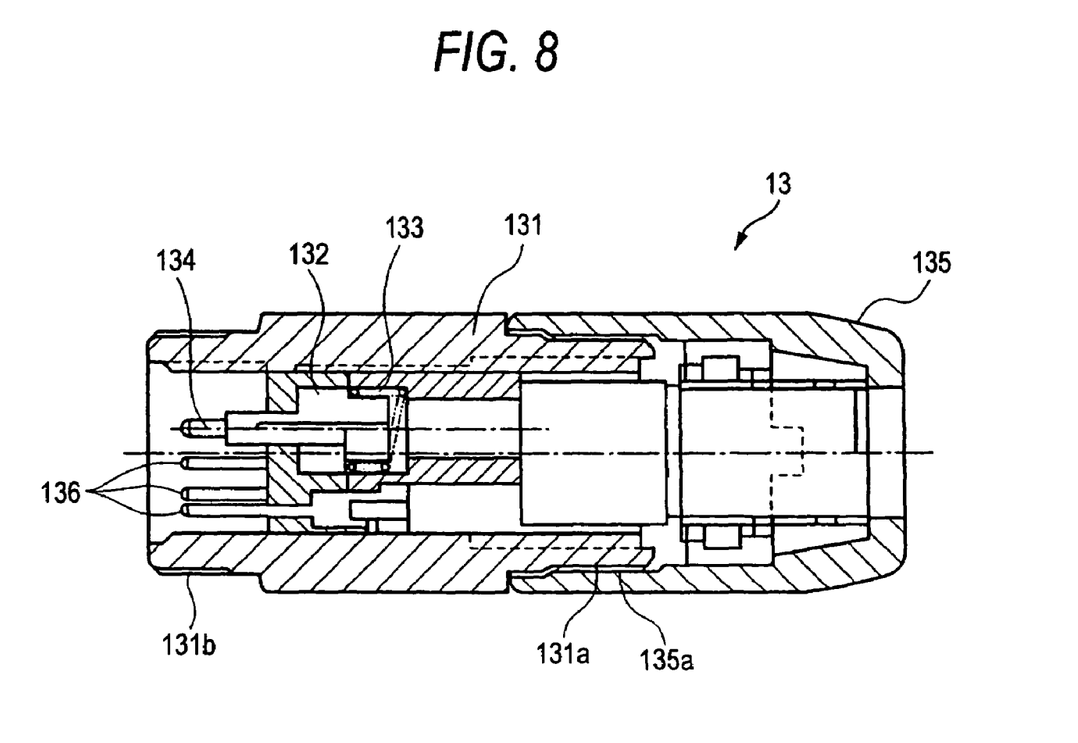
FIG. 8 is a longitudinal sectional view to show the structure of an adapter connected to each of a transmission cable and a reception cable in FIG. 1.

The adapter 13 of each of the transmission cable 10 and the reception cable 30 is provided with metal contacts (male pins) 136 fitted into the metal contacts (female pins) 213 of the plug 22 of the intermediate cable 20, as shown in FIG. 8. In the embodiment, the ferrule 210 for bundling the four-core optical fiber 211 is adopted and further a structure of collecting the five metal contacts 213 in the same connector (plug, adapter) as the ferrule 210 is adopted. The structure makes it possible to miniaturize the connector (plug, adapter) and improve the laying adaptability in piping.

Next, the structures of the plug 22 and the adapter 13 will be discussed in detail.

Figure 6A:
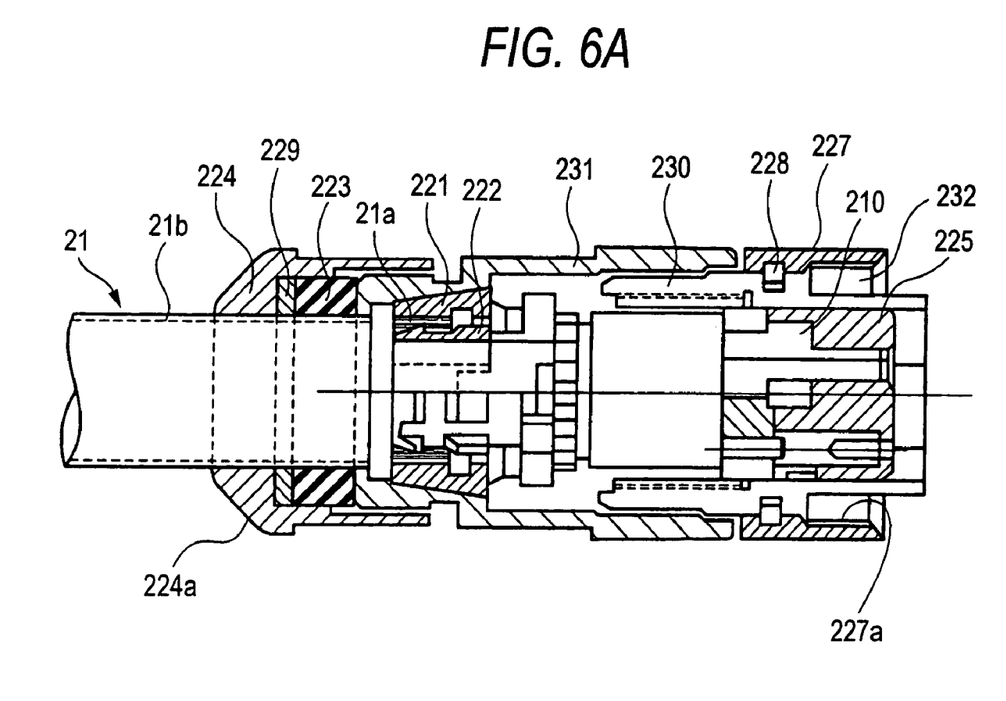
FIGS. 6A and 6B are longitudinal sectional views to show the structure of the plug connected to the intermediate cable in FIG. 1.
Figure 6B:
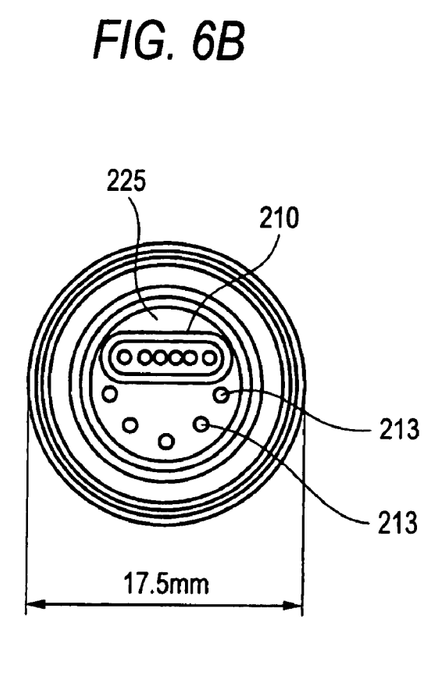

FIG. 6A is a longitudinal sectional view to show the structure of the plug 22 and FIG. 6B is a front view to show the structure of the plug 22.

First, the composite cable 21 to which the plug 22 is connected (see FIG. 1) is made up of a tensile strength fiber 21a and an envelope 21b for enveloping the optical fiber 211 and the metal wires (not shown) containing the tensile strength fiber 21a as well as the optical fiber 211 and the metal wires (not shown).

The plug 22 includes a cable clamp 221 made of a zinc alloy and a Kevler holder 222 as a first fixing mechanism for fixing the tensile strength fiber 21a of the composite cable 21 and a gasket 223 made of silicone rubber as a second fixing mechanism for blocking a twist of the envelope 21b in addition to the ferrule 210.

The gasket 223 has a hole having a diameter a little smaller than the diameter of the envelope 21b of the composite cable 21 and is tightly attached to the envelope 21b, thereby blocking a twist of the envelope 21b.

The gasket 223 is placed in a shell holder nut 231 sheathing a connector main body 230 by a clamp nut 224 together with a clamp washer 229.

The tensile strength fiber 21a of the composite cable 21 has a tip intervened between the cable clamp 221 and the Kevler holder 222. When the clamp nut 224 is fastened into the shell holder nut 231 of the connector main body 230, the cable clamp 221 becomes elastically deformed so as to press the Kevler holder 222 and fixes the tip of the tensile strength fiber 21a to the plug 22 with the tip sandwiched between the cable clamp 221 and the Kevler holder 222.

The clamp nut 224 has a rear end part 224a formed as a slope inclined toward the axial center from the outer face for eliminating engagement of the plug 22 in the pipe conduit when the composite cable 21 is drawn out from piping because of change of laying, etc., thereby facilitating drawing-out work.

Thus, the plug 22 includes the first fixing mechanism made up of the cable clamp 221 and the Kevler holder 222 for fixing the tensile strength fiber 21a and the second fixing mechanism made of the gasket 223 for fixing the envelope 21b and when the composite cable 21 connected to the plug 22 is inserted into piping, the cable insertion work can be conducted without imposing load on the optical fiber 211 or the metal wires 213 of the composite cable 21 and breaks in the optical fiber 211 and the metal wires (not shown) caused by twisting the envelope can be prevented. The rear end part 224a of the clamp nut 224 is formed as a slope, so that the plug 22 enables easy removal from piping.

That is, the plug 22 applied to the invention is provided with the first fixing mechanism and the second fixing mechanism for fixing the tensile strength fiber 21a and the envelope 21b of the composite cable 21 respectively for making it possible to lay the cable in piping, so that the connector size can be made small as compared with a conventional product provided with a separate tension member traction mechanism.

The plug 22 is formed in the front end part with an insulation part 225 where the ferrule 210 and the five female contacts 213 for the metal wires are fixed.

A cylindrical coupling nut 227 formed with an internal screw part 227a is rotatably provided via a gap 232 in the outer surrounding of the insulation part 225.

A lock ring 228 prevents the coupling nut 227 from being detached from the connector main body 230.

When the plug 22 is connected to the adapter 13, the front end part of an adapter shell 131 described later is fitted into the gap 232 formed in the plug 22 and the screw part 227a of the coupling nut 227 of the plug 22 is screwed into a screw part 131b formed on the outer face of the tip of the adapter shell 131.

Figure 7:
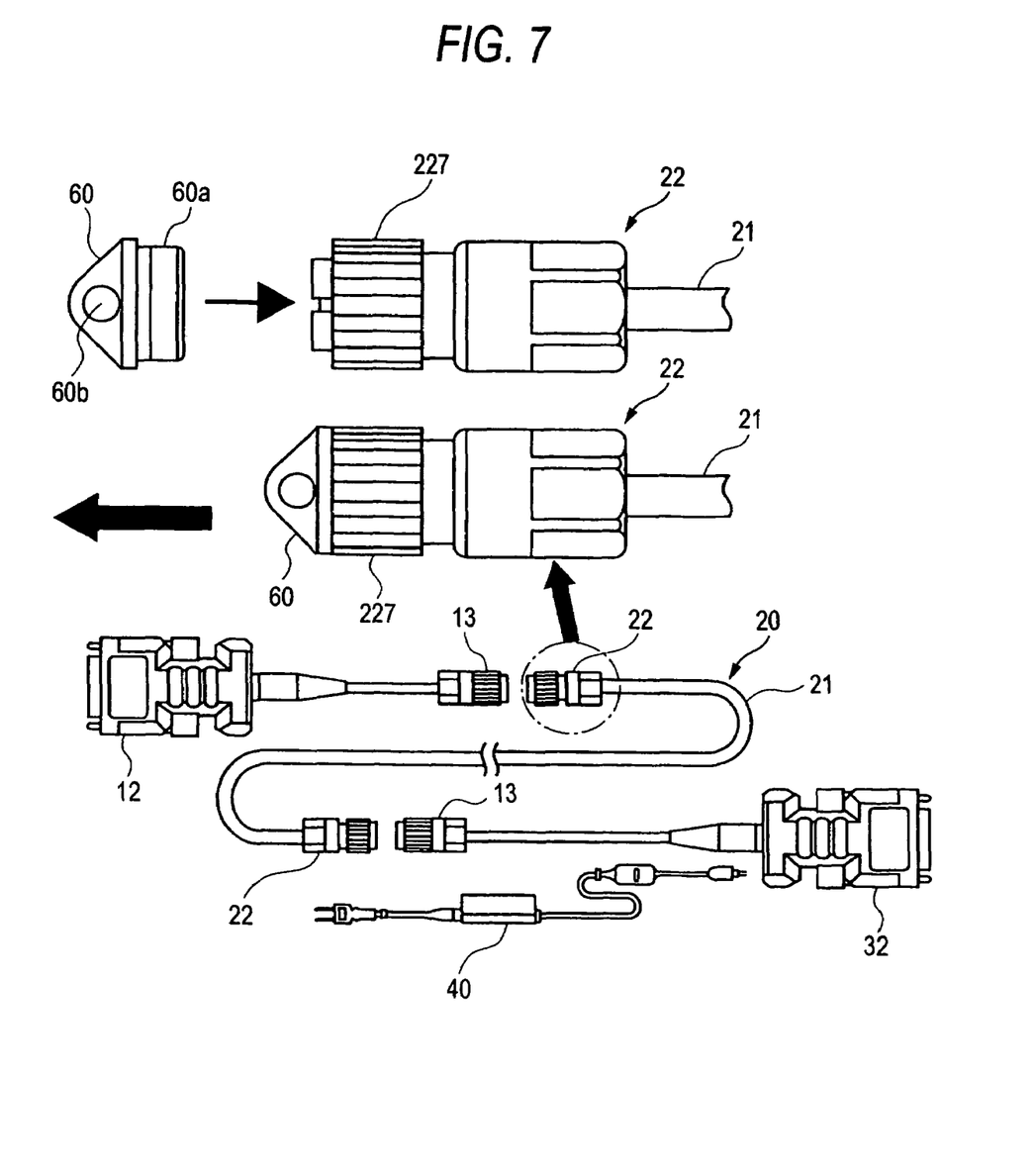
FIG. 7 is a drawing to describe a traction cap used when the intermediate cable in FIG. 1 is laid in piping and a use method of the traction cap.

On the other hand, to lay the plug 22 connected to the cable in piping, a traction cap 60 shown in FIG. 7 is connected to the plug 22.

Using the gap 232 formed to couple the adapter 13, the screw part 227a of the coupling nut 227 of the plug 22 is screwed into a screw part 60a formed on the outer periphery of the cylindrical part fitted into the gap 232, whereby the traction cap 60 is fixed to the plug 22.

A tracking hole 60b is made in the top of the traction cap 60 and a fish wire (not shown) is hooked in the hole 60b and is pulled, whereby the plug 22 connected to the cable can be inserted into piping. In this case, the traction cap 60 includes a rotatable joint mechanism between the cylindrical part where the screw part 60a is formed and the top in which the tracking hole 60b is made, whereby if the fish wire connected to the traction cap 60 is twisted at the laying time, the pulled composite cable 21 is not twisted. Twist prevention can also be accomplished by a joint mechanism of the traction cap 60 and the plug 22.

The traction cap 60 is attached to the plug 22 before connection to the adapter 13, whereby it also has a function of protecting the optical fiber 211 and the metal contacts 213 exposed to the plug face from contamination of dust, etc.

FIG. 8 is a longitudinal sectional view to show the structure of the adapter 13.

In the figure, the adapter 13 includes the ferrule 132 for connecting optical fiber to the adapter shell 131 and the elastic mechanism having the spring 133 for pressing the ferrule 132 against the ferrule 210 of the plug 22.

The adapter 13 has a large dimension in the length direction to include the elastic mechanism and minimizes bending of the optical fiber 211 when the adapter 13 is connected to the plug 22 as previously described in detail with reference to FIGS. 5A to 5C. That is, when the adapter 13 is connected to the plug 22, the ferrule 132 abuts the ferrule 210 of the plug 22 and retreats together with the optical fiber; however, since the adapter 13 has a large dimension in the length direction, bending of the optical fiber can be minimized as previously described with reference to FIG. 5C and the transmission loss of the optical fiber can be prevented.

The ferrule 132 of the adapter 13 is provided with a pair of guide pins 134 fitted into the guide holes 212 made in the ferrule 210 of the plug 22 (see FIG. 4) and the guide pins 134 are fitted into the guide holes 212 for aligning the ferrules.

A screw part 131a is formed in the rear end part of the adapter shell 131 and the screw part 131a and a screw part 135a formed on a shell holder nut 135 are joined for coupling the adapter shell 131 and the shell holder nut 135.

Next, a cable laying method of applying the described optical DVI cable system 1 to previously laid piping will be discussed. The cable laying method includes the following steps of:

(1) joining the traction cap 60 to the tip of one of the two plugs of the intermediate cable 20;

(2) pulling the traction cap 60 and allowing the composite cable 21 connected to the plug 22 to pass through the piping;

(3) removing the traction cap 60 from the plug 22 passed through the piping; and (4) joining the adapter 13 to the plug 22 from which the traction cap 60 is removed.

Thus, according to the optical DVI cable system 1 of the embodiment, the composite cable 21 with the plug 22 attached thereto includes the optical fibers, the metal wires, the tensile strength fiber, and the envelope for enveloping them and the plug 22 includes the ferrule 210 for connecting the optical fiber, the first fixing mechanism for fixing the tensile strength fiber, and the second fixing mechanism for blocking a twist of the envelope and further includes the joint mechanism of the detachable traction cap 60 for pulling the composite cable 21 and inserting the composite cable 21 into piping, so that cable laying can be easily conducted without breaking the optical fiber or the metal wire in the composite cable 21.

Since the plug 22 includes the coupling nut 227 (joint mechanism) for joining the traction cap 60 to the plug, when the composite cable 21 is inserted into piping, the traction cap 60 is joined to the plug 22, whereby the composite cable 21 can be extremely easily inserted into piping. Moreover, since the traction cap 60 is allowed to rotate relative to the plug 22, a twist occurring when the composite cable 21 is inserted into piping can also be absorbed and a break does not occur in wiring between the composite cable 21 and the plug 22 (optical fiber, metal wire).

Since the rear end face of the plug 22 is formed as a slope, when the composite cable 21 inserted into piping is drawn out from the piping, the composite cable 21 can be easily drawn out without catching the plug 22 in any other wire, etc.

Since the adapter 13 includes the spring 133 for pressing the ferrule 132 against the ferrule 210 of the plug 22, the optical fiber and the metal wires of the adapter 13 and those of the plug 22 can be reliably connected. Moreover, since spring 133 is not provided for the plug 22, bending of the optical fiber in the plug 22 does not occur. Thus, the shape of the plug 22 need not be made long and the plug 22 can be miniaturized. Since the plug 22 can be miniaturized, inserting the composite cable 21 into piping can be ensured.

In the embodiment described above, the transmission cable 10 and the reception cable 30 are connected by the intermediate cable 20, but either the transmission cable 10 or the reception cable 30 can be integrated with the intermediate cable 20.

The invention has the advantage that laying the cable in piping can be easily conducted and is useful as a digital signal transmission line for connecting a video output machine of a personal computer, a DVD playback apparatus, etc., and a video input machine of a projector, a liquid crystal display, etc.

While the invention has been described in detail with reference to the specific embodiment, it will be obvious to those skilled in the art that various changes and modifications can be made without departing from the spirit and the scope of the invention.

What is claimed is:

1. An optical DVI cable system provided with a connection point where a plug and an adapter are connected on a line equipped with optical DVI connectors at both ends, wherein
    a first cable connected between the optical DVI connector and the plug comprises an optical fiber, a metal wire, a tensile strength fiber, and an envelope for enveloping them and is laid as the plug is passed through piping, and wherein
    the plug comprises a first ferrule for connecting the optical fiber, a first fixing mechanism for fixing the tensile strength fiber, a second fixing mechanism for blocking a twist of the envelope, and a joint mechanism of a detachable traction cap for pulling the cable and allowing the cable to pass through the piping.

2. The optical DVI cable system as claimed in claim 1 wherein the joint mechanism of the traction cap is joint means formed for allowing either the cap or the plug to rotate relative to the other.

3. The optical DVI cable system as claimed in claim 1 wherein a rear end face of the plug is formed as a slope inclined toward the axial center from the outer face.

4. The optical DVI cable system as claimed in claim 1 wherein the adapter comprises a second ferrule for connecting the optical fiber and an elastic mechanism for pressing the second ferrule against the first ferrule and the second ferrule abuts the first ferrule at the connection point and retreats into the adapter.

5. The optical DVI cable system as claimed in claim 1 wherein the plug has an outer diameter of 19 mm or less.

6. A method of laying cable, which applies the optical DVI cable system as claimed in claim 1 to previously laid piping, said cable laying method comprising the steps of:
    joining the traction cap to the tip of the plug detached at the connection point;
    pulling the traction cap and allowing the first cable connected to the plug to pass through the piping;
    removing the traction cap from the plug passed through the piping; and
    joining the plug from which the traction cap is removed to the adapter.

7. The cable laying method as claimed in claim 6 wherein the plug has an outer diameter of 19 mm or less and is passed through the piping.

* * * * *